United States Patent [19]

Lennox et al.

[11] 4,003,879

[45] Jan. 18, 1977

[54] POLYAMIDES

[75] Inventors: Alan Francis Lennox, Welwyn Garden City; John Brewster Rose, Letchworth, both of England

[73] Assignee: Imperial Chemical Industries Limited, London, England

[22] Filed: Oct. 11, 1973

[21] Appl. No.: 405,260

Related U.S. Application Data

[63] Continuation of Ser. No. 259,606, June 5, 1972, abandoned.

[30] Foreign Application Priority Data

June 7, 1971 United Kingdom ............ 19190/71

[52] U.S. Cl. .............................. 260/49; 260/37 N
[51] Int. Cl.² ................. C08G 69/40; C08G 69/42
[58] Field of Search ............... 260/49, 47 CZ, 78 R

[56] References Cited

UNITED STATES PATENTS 3,505,288  4/1970  Bodesheim et al. ................. 260/47
3,631,003  12/1971  Goodman et al. ................. 260/78 R

*Primary Examiner*—Lester L. Lee
*Attorney, Agent, or Firm*—Cushman, Darby & Cushman

[57] ABSTRACT

A polyamide comprising repeating units having the structure I

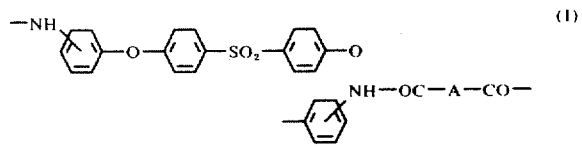

in which A is a bivalent aliphatic, cycloaliphatic or araliphatic residue containing at least 4 carbon atoms.

5 Claims, No Drawings

POLYAMIDES

This application is a continuation of Ser. No. 259,606 filed June 5, 1972 and now abandoned.

This invention relates to polyamides, and in particular to polyamides derived from aromatic diamines and aliphatic dicarboxylic acids.

According to the present invention, a polyamide is provided comprising repeating units having the structure I

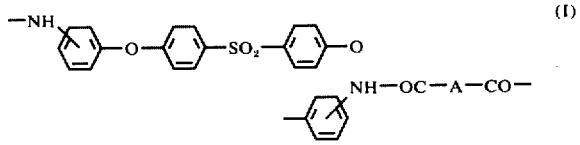

in which A is a bivalent aliphatic, cycloaliphatic or araliphatic residue containing at least 4 carbon atoms.

In a further embodiment of the invention, a process is provided for the preparation of a polyamide which comprises reacting at least one bis-[4-(aminophenoxy)-phenyl] sulphone having the formula II

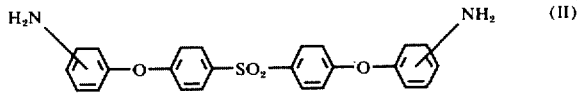

with a substantially equimolar quantity of at least one α,ω-alkane dicarboxylic acid having the formula III

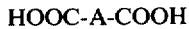

HOOC-A-COOH (III)

where A is as defined above.

The bis-[4-(aminophenoxy)-phenyl] sulphones (II) which may be used in the preparation of polyamides of the invention include diamines in which the amino groups are substituted in the 2,2'-, 2,3'-, 2,4'-, 3,4'- and 4,4'- positions. Bis-[4-(4-aminophenoxy)-phenyl] sulphone is a preferred diamine. Preferably the bis-[4-(aminophenoxy)-phenyl] sulphones are unsubstituted except for the amino-groups but if desired the aromatic hydrogen atoms may be replaced by alkyl groups having from 1 to 4 carbon atoms, that is methyl, ethyl, n-propyl, iso-propyl, n-butyl, isobutyl, or tert-butyl groups, alkoxy groups having from 1–4 carbon atoms, that is methoxy, ethoxy, n-propoxy, iso-propoxy, n-butoxy, iso-butoxy or tert-butoxy groups, or halogen atoms, especially chlorine and bromine atoms. It is preferred that not more than two hydrogen atoms be substituted on each benzene ring. The sulphones are preferably used as such, but amide-forming derivatives thereof, for example the hydrochlorides, may be used if desired. Mixtures of the diaminodiphenyl sulphones may be used if desired.

The dicarboxylic acids that may be used are preferably α,ω-dicarboxylic acids of the formula

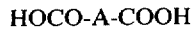

HOCO-A-COOH in which A has the structure —(CH₂)ₙ- where n is 4 or more, but branched-chain alkane-dicarboxylic acids, cycloaliphatic dicarboxylic acids (such as cyclohexane-1,4-dicarboxylic acid) and araliphatic dicarboxylic acids having the carboxyl groups bound to non-aromatic carbon atoms (for example phenylene-1,4-diacetic acid in which A is a 1,4-xylylene radical) may also be used.

The α,ω-alkanedicarboxylic acids whose diacid halides may be used in the preparation of the polyamides include, for example adipic acid, pimelic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,15-pentadecanedicarboxylic acid, 1,16-hexadecanedicarboxylic acid, 1,18-octadecanedicarboxylic acid and 1,20-eicosanedicarboxylic acid.

It is preferred to use those acids wherein n in the structure HOCO-(CH₂)ₙ-COOH is not more than 14, and more preferably 4, 5, 6, 7, 8 or 10, on account of availability. Mixtures of such acids may be used if desired.

The process by which the polyamides of the invention may be prepared may be carried out by melting the reactants together such as for example those described in British patent specification Nos. 1 254 003 and 1 254 007 and German patent application No. 2 142 220 although the temperature should be kept to a minimum to avoid discolouration but is more conveniently carried out in the presence of an inert dipolar organic diluent. It is preferable to use a diluent in which the polymeric product remains soluble until high molecular weight is attained. Suitable dipolar diluents for the reaction include lower dialkyl and cyclic alkylene sulphones and sulphoxides (e.g. dimethyl sulphoxide and 1,1-dioxothiolan), nitriles (e.g. benzonitrile, acetonitrile), ketones (e.g. acetone, methyl ethyl ketone) and N,N-dialkylcarboxamides of aliphatic carboxylic acids (e.g. dimethylacetamide). It has been particularly useful to use an N,N-dialkylcarboxamide, preferably N,N-dimethylacetamide as both acid acceptor and solvent; N-methylpyrrolidone may also be used as both solvent and acid acceptor.

The reaction is preferably effected in the presence of an acid acceptor. Such acid acceptors are well-known for polycondensation reactions and include, for example, tertiary amines, for example triethylamine and N,N-dialkylcarboxamides, and inorganic salts of weak acids and strong bases, for example sodium carbonate and ammonium carbonate. It is preferred that the acid acceptor be soluble in the organic solvent employed in the polymerisation process, but where the acid acceptor is insoluble in that solvent, for example as in the case of sodium carbonate, it may be added to the reaction mixture as a solid suspension.

The reaction is preferably effected at a temperature at or below room temperature, to minimize discolouration and allow a high molecular weight product to be obtained. Temperatures in the range −20° C to +25° C are preferred. Higher or lower temperatures may be used if desired.

The reaction is preferably effected in the absence of oxygen to minimise discolouration of the product, and it has been found advantageous to effect the process under an atmosphere of an inert gas, for example nitrogen. The pressure at which the reaction is effected is not critical, and it has been found convenient to use atmospheric pressure.

The polyamides have been found to be suitable for structural applications, particularly those where absorption of water might have been deleterious. They may be shaped, for example by extrusion, moulding or vacuum forming, in conventional equipment for shaping thermoplastic materials, or, alternatively, they may be dissolved in suitable solvents, for example N,N-dimethylformamide, N,N-dimethylacetamide, dimethylsulphoxide, N-methylpyrrolidone and hexamethylphosphoramide, and films, filaments and fibres, which are generally transparent, may be obtained from the solutions. Such films, filaments and fibres may be drawn if desired.

The shaped products produced by these processes are strong and tough, their properties being comparable with, and in many cases better than, those of conventional structural polymers known in the art, such properties being maintained to temperatures approaching the full Vicat softening points of the polymers, themselves surprisingly high.

For such structural applications, it is preferred that the polymer have a reduced viscosity, as hereinafter defined, in the range 0.8 to 2.0 deciliters gm⁻1, measured on a 1 gm. deciliter⁻¹ solution in 98% sulphuric acid at 25° C.

The polyamides of our invention are resistant to water and to corrosive atmospheres both acid and alkaline and resist chemical and thermal degradation. They give transparent films and moulded articles which resist crazing on immersion in various organic solvents when under stress. These polymers also show useful dielectric properties. Thus, in the form of film, they may be used as decorative trim, slot liners in electrical motors, insulation in transformers, capacitors, cables and the like. They may also be moulded, for example, into corrosion-resistant pipe or into containers. Solutions of the polymers may be used as varnishes and adhesives and for coating wire, fabric and the like. Fibres formed from the polymers, for example by spinning from solution, may be woven into fabric, for example for making protective clothing or filters, or may be formed into woven electrical sheathing.

The polymers of the present invention may be further modified by the inclusion in the polymerisation reaction mixture of small amounts of reactive monofunctional materials, for example aniline, diphenylamine and acetyl chloride, to act as molecular weight regulators, and/or small amounts of reactive trifunctional or higher polyfunctional materials, for example 4,4'-diaminodiphenylamine, 2,4,4'-triaminodiphenyl sulphone or 3,3'-diaminobenzidine, to act as chain branching and cross-linking agents.

The polyamides of the present invention may, if desired, have mixed therewith conventional additives such as, for example, heat and light stabilisers, lubricants, plasticisers, pigments, dyes, mould-release agents and fillers such as glass fibre, asbestos fibre, finely powdered metals or metal oxides, graphite, carbon black, ground glass and molybdenum disulphide, and may be blended with other polymeric materials, natural or synthetic.

The invention is now illustrated by the following Example.

By reduced viscosity, hereinbefore and in the Example, we mean the value obtained for $$\frac{t - t_0}{t_0 \cdot c}$$

where $t$ is the flow time of a "$c$" gms. deciliter⁻¹ solution of the polymer in a given solvent through a given viscometer and $t_0$ is the flow time of the same volume of pure solvent through the same viscometer under the same conditions.

Bis-[4-(4-aminophenoxy)-phenyl] sulphone (17.28 g; 0.04 moles; recrystallised from methanol/benzene 1:1 v/v) and dimethylacetamide (85 g; redistilled) were charged into a 500 cm³ round bottomed flask fitted with a stirrer, nitrogen inlet and outlet. Redistilled adipoyl chloride (8.32 g; 0.045 moles) was added dropwise, whilst maintaining the temperature of the reaction vessel at less than 15° C, until there was no positive reaction to dimethylaminobenzaldehyde indicating that no free amine was present in the reaction mixture. The reaction mixture was then stirred for a further 1 hour at 20° C. Lithium hydroxide (3.6 g) was then added and the mixture stirred for a further 1.5 hours. The mixture was macerated with methanol (100 cm³), washed twice with hot methanol, once with methanol/acetone mixture (1:1 v/v) and dried under vacuum. The resulting polymer had a reduced viscosity of 0.52 dl/g and had an infra red spectrum consistent with its consisting of repeat units having the formula

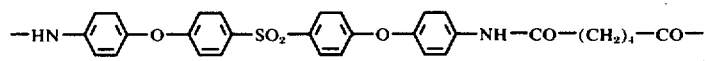

(IV)

A similar polymer could be prepared using either sebacoyl chloride or azelaoyl chloride in place of the adipoyl chloride used above.

The polymer (IV) was compression-moulded at 270° C into a clear, tough film.

A film was prepared from a similar polymer but having a reduced viscosity of 0.66 dl/g. After immersion in boiling water for 216 hours, the film was clear and flat and the polymer had a reduced viscosity of 0.41 dl/g.

For comparison a film was prepared by compression-moulding a polymer (reduced viscosity 0.66 dl/g) having the structure

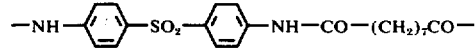

and prepared by a method similar to that described in British specification 1 254 003. This film on immersion in boiling water for 216 hours, became opaque and curled and the polymer had a reduced viscosity of 0.26.

We claim:

1. A polyamide consisting essentially of repeating units having the structure

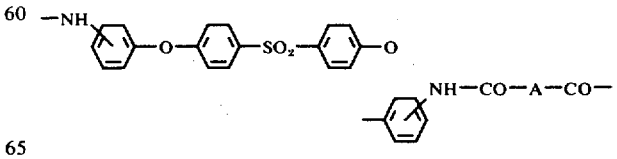

in which A is a bivalent aliphatic, cycloaliphatic or araliphatic radical containing at least 4 carbon atoms, said polyamide having improved resistance to opacity and curling on immersion in boiling water.

2. A polyamide according to claim 1 in which the amine linking groups are para to the ether linking groups.

3. A polyamide according to claim 1 in which A is a bivalent aliphatic radical.

4. A polyamide according to claim 3 in which A has 4 to 8 carbon atoms.

5. A polyamide according to claim 1 in the form of a moulded article.

* * * * *